US006840325B2

(12) United States Patent
Stephenson (10) Patent No.: US 6,840,325 B2
(45) Date of Patent: Jan. 11, 2005

(54) EXPANDABLE CONNECTION FOR USE WITH A SWELLING ELASTOMER

(75) Inventor: David J. Stephenson, Dubai (AE)

(73) Assignee: Weatherford/Lamb, Inc., Houston, TX (US)

(*) Notice: Subject to any disclaimer, the term of this patent is extended or adjusted under 35 U.S.C. 154(b) by 14 days.

(21) Appl. No.: 10/255,571

(22) Filed: Sep. 26, 2002

(65) Prior Publication Data

US 2004/0060706 A1 Apr. 1, 2004

(51) Int. Cl.[7] .................... E21B 17/00; E21B 23/00
(52) U.S. Cl. .................. 166/380; 166/207; 166/242.6; 166/382
(58) Field of Search ............... 166/380, 378, 166/382, 242.6, 206, 207; 285/925; 277/934, 652

(56) References Cited

U.S. PATENT DOCUMENTS

| | | | | |
|---|---|---|---|---|
| 2,094,691 A | * | 10/1937 | Williams | 277/314 |
| 2,306,160 A | | 12/1942 | Freyssinet | 288/6 |
| 2,519,116 A | | 8/1950 | Crake | 166/10 |
| 2,656,891 A | | 10/1953 | Toelke | 166/13 |
| 2,814,517 A | | 11/1957 | Razdow | 288/20 |
| 2,945,541 A | | 7/1960 | Maly et al. | 166/187 |
| 3,147,016 A | | 9/1964 | Traufler | 277/226 |
| 3,385,367 A | | 5/1968 | Kollsman | 166/191 |
| 3,593,799 A | | 7/1971 | Boughton et al. | 166/295 |
| 3,677,987 A | | 7/1972 | Pence, Jr. | 260/29.6 |
| 3,690,375 A | | 9/1972 | Shillander | 166/187 |
| 3,740,360 A | | 6/1973 | Nimerick | 260/17.4 |
| 3,918,523 A | | 11/1975 | Stuber | 166/285 |
| 4,078,606 A | | 3/1978 | Montgomery | 166/120 |
| 4,137,970 A | | 2/1979 | Laflin et al. | 166/292 |
| 4,253,676 A | | 3/1981 | Baker et al. | 277/34.6 |
| 4,300,775 A | | 11/1981 | Ringel | 277/34.3 |
| 4,403,660 A | | 9/1983 | Coone | 166/387 |
| 4,406,469 A | | 9/1983 | Allison | 277/123 |

(List continued on next page.)

FOREIGN PATENT DOCUMENTS

| | | | |
|---|---|---|---|
| EP | 0 237 662 | 9/1987 | ........... E21B/34/10 |
| FR | 2 834 325 | 7/2003 | |
| FR | 2 834 326 | 7/2003 | |
| GB | 2 386 626 | 9/2003 | |
| GB | 2 387 405 | 10/2003 | |
| WO | WO 02/20941 | 3/2002 | ......... E21B/33/128 |
| WO | WO 02/059452 | 8/2002 | ........... E21B/33/00 |

OTHER PUBLICATIONS

UK Search Report, GB Application No. GB0305141.4, dated Dec. 4, 2003.
U.S. patent application Ser. No. 10/443,442, Whanger et al., filed May 22, 2003.
U.S. patent application Ser. No. 10/328,708, Whanger et al., filed Dec. 23, 2002.
U.S. patent application Ser. No. 10/317,843, Whanger et al., filed Dec. 12, 2002.
U.S. patent application Ser. No. 10/034,592, Lauritzen et al., filed Dec. 28, 2001.

Primary Examiner—Hoang Dang
(74) Attorney, Agent, or Firm—Moser, Patterson & Sheridan, L.L.P.

(57) ABSTRACT

The present invention generally relates to an apparatus for use in a wellbore. In one aspect, the apparatus includes a first tubular having a connection portion at the end thereof and a second tubular having a mating connection portion at an end thereof. The connection portion and mating connection portion are constructed and arranged to form a connection between the tubulars. The apparatus further includes a swelling elastomer disposable between the connection portion and the mating connection portion, the swelling elastomer expandable upon contact with an activating agent. In another aspect, the invention provides a method for utilizing an expandable connection in a wellbore.

23 Claims, 5 Drawing Sheets

U.S. PATENT DOCUMENTS

| | | | | |
|---|---|---|---|---|
| 4,449,713 A | * | 5/1984 | Ishido et al. | 277/312 |
| 4,452,463 A | | 6/1984 | Buckner | 277/120 |
| 4,457,369 A | | 7/1984 | Henderson | 166/125 |
| 4,601,498 A | | 7/1986 | Haugen | 285/332.3 |
| 4,633,950 A | | 1/1987 | Delhommer et al. | 166/295 |
| 4,662,450 A | | 5/1987 | Haugen | 166/299 |
| 4,674,570 A | | 6/1987 | Jackson | 166/187 |
| 4,730,670 A | | 3/1988 | Kim | 166/134 |
| 4,762,179 A | | 8/1988 | Wesson et al. | 166/297 |
| 4,836,940 A | | 6/1989 | Alexander | 252/8.512 |
| 4,862,967 A | | 9/1989 | Harris | 166/387 |
| 4,886,117 A | | 12/1989 | Patel | 166/187 |
| 4,907,651 A | | 3/1990 | Bou-Mikael | 166/114 |
| 4,913,232 A | | 4/1990 | Cheymol et al. | 166/285 |
| 4,919,989 A | * | 4/1990 | Colangelo | 428/66.4 |
| 5,086,841 A | | 2/1992 | Reid et al. | 166/295 |
| 5,165,703 A | | 11/1992 | Morvant | 277/188 |
| 5,195,583 A | * | 3/1993 | Toon et al. | 166/187 |
| 5,226,492 A | | 7/1993 | Solaeche P. et al. | 166/196 |
| 5,271,469 A | | 12/1993 | Brooks et al. | 166/387 |
| 5,309,993 A | | 5/1994 | Coon et al. | 166/115 |
| 5,311,938 A | | 5/1994 | Hendrickson et al. | 166/134 |
| 5,511,620 A | | 4/1996 | Baugh et al. | 166/387 |
| 5,605,195 A | | 2/1997 | Eslinger et al. | 166/387 |
| 5,623,993 A | | 4/1997 | Van Buskirk et al. | 166/292 |
| 5,676,384 A | | 10/1997 | Culpepper | 277/188 |
| 5,738,146 A | * | 4/1998 | Abe | 138/97 |
| 5,749,585 A | | 5/1998 | Lembcke | 277/116.2 |
| 5,787,987 A | | 8/1998 | Forsyth et al. | 166/313 |
| 5,803,178 A | | 9/1998 | Cain | 166/306 |
| 5,833,001 A | | 11/1998 | Song et al. | 166/287 |
| 5,875,847 A | | 3/1999 | Forsyth | 166/313 |
| 5,941,313 A | | 8/1999 | Arizmendi | 166/387 |
| 6,009,951 A | | 1/2000 | Coronado et al. | 166/387 |
| 6,041,858 A | | 3/2000 | Arizmendi | 166/187 |
| 6,073,692 A | | 6/2000 | Wood et al. | 166/187 |
| 6,446,717 B1 | | 9/2002 | White et al. | 166/187 |

* cited by examiner

Fig. 4B

EXPANDABLE CONNECTION FOR USE WITH A SWELLING ELASTOMER

BACKGROUND OF THE INVENTION

1. Field of the Invention

The present invention relates to wellbore completion. More particularly, the invention relates to an apparatus and method for attaching and sealing two tubulars. More particularly still, the invention relates to maintaining a seal at the connection point between the two tubulars during the expansion operation.

2. Description of the Related Art

In the drilling of oil and gas wells, a wellbore is formed using a drill bit that is urged downwardly at a lower end of a drill string. After drilling a predetermined depth, the drill string and bit are removed, and the wellbore is typically lined with a string of steel pipe called casing. The casing provides support to the wellbore and facilitates the isolation of certain areas of the wellbore adjacent hydrocarbon bearing formations. The casing typically extends down the wellbore from the surface of the well to a designated depth. An annular area is thus defined between the outside of the casing and the earth formation. This annular area is filled with cement to permanently set the casing in the wellbore and to facilitate the isolation of production zones and fluids at different depths within the wellbore.

It is common to employ more than one string of casing in a wellbore. In this respect, a first string of casing is set in the wellbore when the well is drilled to a first designated depth. The well is then drilled to a second designated depth, and a second string of casing, or liner, is run into the well to a depth whereby the upper portion of the second liner overlaps the lower portion of the first string of casing. The second liner string is then fixed or hung in the wellbore, usually by some mechanical slip mechanism well-known in the art, and cemented. This process is typically repeated with additional casing strings until the well has been drilled to total depth.

Operators are continually searching for means to improve functionality and reduce costs in their drilling operations. This has been achieved in the past in relatively small increments by such things as discrete technological improvements and novel contracting strategies. It is inevitable that these incremental gains are diminishing. The industry needs a radical "next step." The monobore well is this step.

Monobore wells have a uniform through-bore from the surface casing to the production zones. Today, wells are constructed by progressively securing the borehole with several intermediate casings before the production casing is run. Monobore well technology will eliminate these intermediate casing strings through the use of expandable liners. Monobore wells consist of a sequence of expandable liners that are run through the existing casing, then expanded to achieve the same post-expansion through-bore. A monobore well features each progressive borehole section being cased without a reduction of casing size.

Many conventional wells drilled today consist of a 26-inch or 30-inch conductor and 20-inch or 18 5.8-inch surface casing (or similar sizes), and have several intermediate casings before a 9 5.8-inch production casing is run. The monobore well offers the advantage of being able to start with a much smaller surface casing but still resulting in a 9 5.8-inch production casing. Because top-hole sizes are reduced, less drilling fluid is required and fewer cuttings are created which means less cleaning of the cuttings, and the environmental problem of drilling waste disposal is reduced. Also, with a smaller surface casing size (and only one other actual casing string), the wellhead can be simplified, as can the BOP'S (blow out protectors) and risers. Many drilling plans include a contingency casing or liner to allow for problem zones. Careful planning of a monobore well enables problem zones to be secured without sacrificing a casing size in the well design. Additionally, running expandable liners instead of long casing strings will result in valuable time savings.

Generally, expandable liners for a monobore well or a conventional well are constructed of 38-foot long tubulars. Each expandable liner includes a female thread at the top and a male thread at the bottom. Typically, the top and bottom threaded portions are expandable in the same manner as the expandable liner. A series of expandable liners are commonly screwed together as they are lowered in the wellbore. As the female thread is connected with the male thread, a metal-to-metal seal is created. Additionally, two external O-rings may be disposed on the threads between the two expandable liners to enhance the sealing effect between the male and female thread.

After the entire length of expandable liner is deployed into the wellbore, the expandable liners are typically expanded by the use of a cone-shaped mandrel or by an expander tool. The expander tool is generally run into the wellbore on a tubular string and includes expandable, fluid actuated members disposed on a body. There are a number of advantages to expanding solids using a rotary tool as the expander tool, rather than existing methods involving driving a fixed cone through the pipe. For example, the process is controllable, thereby allowing expansion to be initiated when and wherever required. If necessary, the expander tool can be recovered in a mid-expansion position, and redeployed to continue the operation. Further, the rollers reduce the friction between the tool and the pipe, which allows the expandable liners to be expanded from the top down.

While expanding expandable liners in a wellbore offers obvious advantages, there are problems associated with using the technology. By plastically deforming the expandable liner, the cross-sectional thickness of the expandable liner is necessarily reduced. As a result, the tight metal-to-metal seal created between the female thread and the male thread becomes slack, thereby jeopardizing the seal at the threaded connection. Simply increasing the initial cross-sectional thickness of the expandable liner to compensate for the reduced wall thickness after expansion results in an increase in the amount of force needed to expand the expandable liner.

A need, therefore, exists for an expandable liner connection between two expandable tubulars that maintains its rigidity after the expansion process. There is a further need for an expandable liner connection providing an effective seal at the threaded connection between the expandable liner strings. There is yet a further need for an effective method for ensuring wellbore fluid will not leak through the expandable liners at the threaded connection.

SUMMARY OF THE INVENTION

The present invention generally relates to an apparatus for use in a wellbore. In one aspect, the apparatus includes a first tubular having a connection means at the end thereof and a second tubular having a mating connection means at an end thereof. The connection means and mating connection means are constructed and arranged to form a connection between the tubulars. The apparatus further includes a swelling elastomer disposable between the connection means and the mating connection means, the swelling elastomer expandable upon contact with an activating agent.

In another aspect, the invention provides a method for utilizing an expandable connection in a wellbore. The method includes running an assembly on a tubular string into the wellbore. The assembly includes a first tubular having a connection means, a second tubular having a mating connection means, the connection means and mating connection means are constructed and arranged to form a connection between the tubulars. The assembly also includes a swelling elastomer disposable between the connection means and the mating connection means. The method further includes the steps of applying a force to an inner surface of the connection and expanding the assembly radially outward. The method also includes the step of exposing the swelling elastomer to an activating agent, thereby ensuring that a space within the connection is substantially filled with the swelling elastomer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figures 1A, 1B:
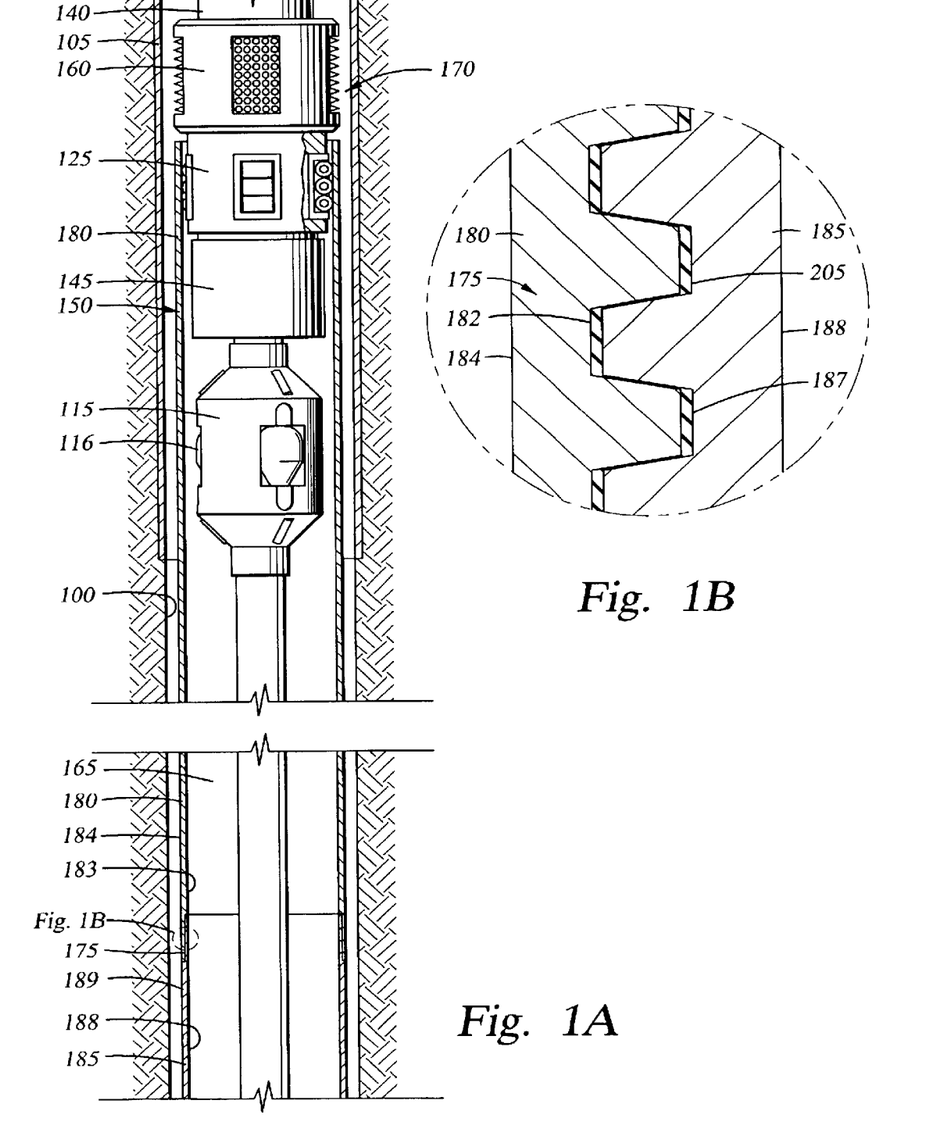
FIG. 1A is a cross-sectional view illustrating an expandable liner of this present invention and a running assembly being lowered into the wellbore on a work string.
FIG. 1B is an enlarged cross-sectional view illustrating a swelling elastomer disposed on a threaded connection between the upper tubular and the lower tubular.

FIG. 1 is a cross-sectional view illustrating an expandable liner 150 of the present invention and a running assembly 170 being lowered into the wellbore 100 on a work string 140. As depicted, a casing string 105 is disposed in the wellbore 100, however, it should be noted that aspects of this present invention are not limited to use with a partially cased wellbore, but rather can be also be used with a cased or uncased wellbore. An uncased wellbore is known in the industry as an open hole wellbore that typically remains open to provide a flow path for hydrocarbons from the surrounding formation. Thereafter, the wellbore may be closed by employing the present invention in a similar manner as described below.

The running assembly 170 includes an upper torque anchor 160 to secure the running assembly 170 and the expandable liner 150 in the casing 105. As shown in FIG. 1A, the upper torque anchor 160 is in a retracted position to allow the running assembly 170 to place the expandable liner 150 in the desired location for expansion of the liner 150. Additionally, a lower torque anchor 125, which is disposed below the upper torque anchor 160, is used to attach the expandable liner 150 to the running assembly 170. A motor 145 is disposed at the lower end of the torque anchor 125 to provide rotational force to turn an expander tool 115.

FIG. 1A depicts the expander tool 115 with rollers 116 retracted, so that the expander tool 115 may be easily moved and placed in the desired location for expansion of the liner 150. When the expander tool 115 has been located at the desired depth, hydraulic pressure is used to actuate the pistons (not shown) and to extend the rollers 116 so that they may contact the inner surface of the expandable liner 150, thereby expanding the liner 150 into the wellbore 100. Generally, hydraulic fluid (not shown) is pumped from the surface to the expander tool 115 through the work string 140.

The expandable liner 150 includes an upper tubular 180 having an inner surface 183 and an outer surface 184. The upper tubular 180 also includes a connection means or a threaded portion 182 on the inner surface 183 which is typically known to one skilled in the art as a female thread. As shown, the expandable liner 150 further includes a lower tubular 185 having an inner surface 188 and an outer surface 189. Additionally, the lower tubular 185 includes a connection means or threaded portion 187 on the outer surface 189, which is typically known to one skilled in the art as a male thread. The connecting means of the upper and lower tubulars may be brought together to form a threaded connection 175.

FIG. 1B is an enlarged cross-sectional view illustrating a swelling elastomer 205 disposed on the threaded connection 175 between the upper tubular 180 and the lower tubular 185. A coating of the swelling elastomer 205 may be applied to the threaded portion 182 of the upper tubular 180 prior to the connection to the lower tubular 185. Thereafter, the threaded portion 182 on the upper tubular 180 mates with the threaded portion 187 on the lower tubular 185 to form the threaded connection 175. In this respect, the swelling elastomer 205 creates a fluid tight seal between the tubulars 180, 185 by filling the voids between the metal-to-metal seal created in the threaded connection 175. Alternatively, the swelling elastomer 205 may be applied to the threaded portion 187 on the lower tubular 185 prior to the connection to the upper tubular 180. Alternatively still, the swelling elastomer 205 may be applied to both the threaded portion 182 on the upper tubular 180 and the threaded portion 187 on the lower tubular 185. Preferably, a very thin coat of swelling elastomer 205 is applied to the threaded portions 182, 187. However, the thickness of the swelling elastomer 205 coating may vary depending on the size and the type of thread used to connect the tubulars 180, 185. Additionally, FIG. 1B illustrates the threaded connection 175 with the swelling elastomer 205. However, it should be understood that this invention is not limited to threaded connections but rather could be used with other types of expandable connections.

In one embodiment, the swelling elastomer 205 is a cross-linked polymer that will swell multiple times its initial size upon activation by an activating agent. Generally, the activating agent stimulates the polymer chains of the swelling elastomer 205 both radial and axially. In the preferred embodiment, an activating agent such as a wellbore fluid or some form of hydraulic fluid activates the swelling elastomer 205. However, other embodiments may employ different types of swelling elastomers that are activated by other forms of activating agents.

To keep the swelling elastomer 205 in an inactivated state during the run-in operation, the elastomer 205 is maintained within a predetermined location. In the preferred embodiment, the threaded portions 182, 187, substantially enclose the swelling elastomer 205, thereby preventing any fluid or activating agent from contacting the swelling elastomer 205.

Figure 2:
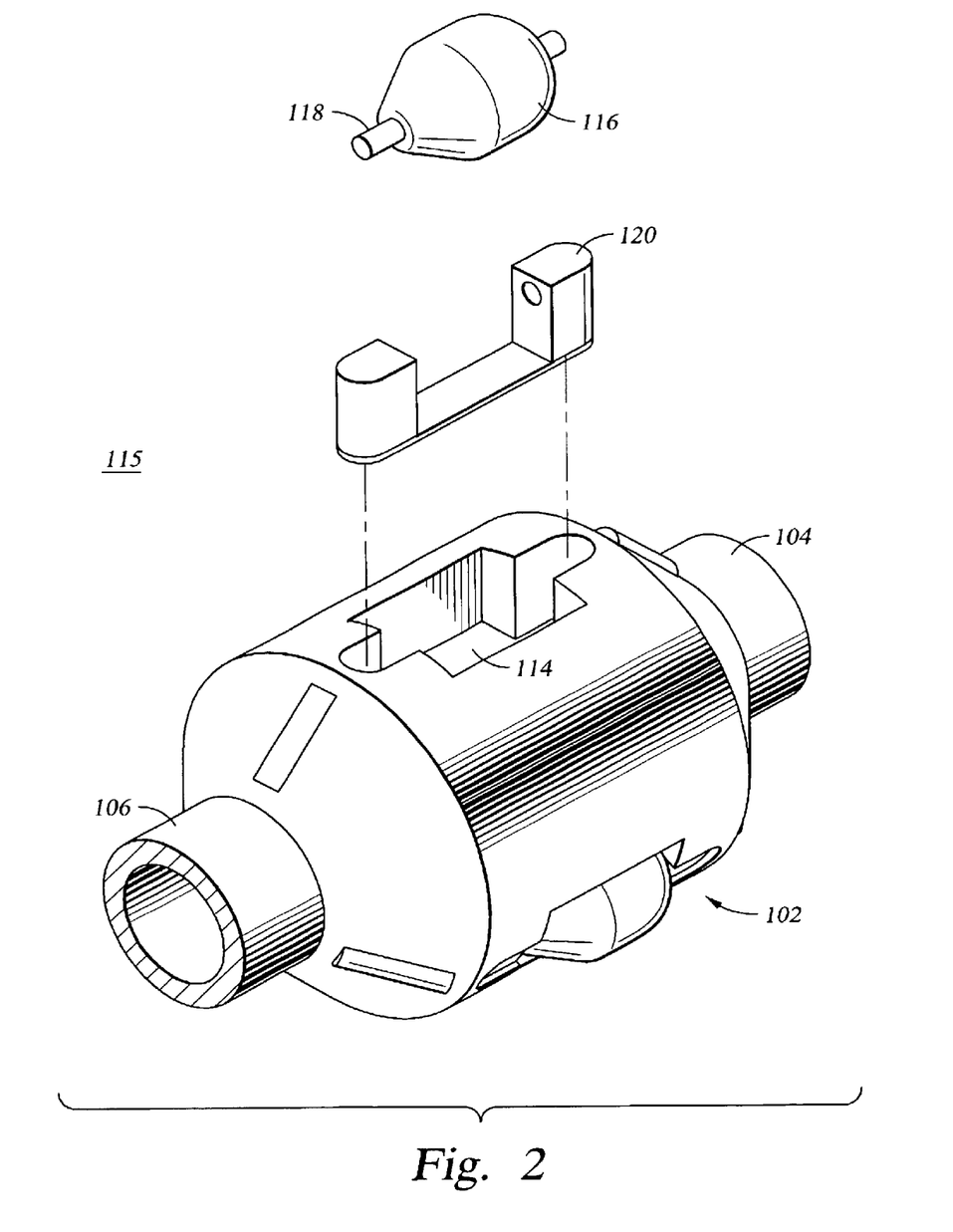
FIG. 2 is an exploded view of an exemplary expander tool.

The expandable liner 150 of the present invention is expanded by the expander tool 115 acting outwardly against the inside surfaces 183, 188 of the upper and lower tubulars 180, 185. FIG. 2 is an exploded view of an exemplary expander tool 115 for expanding the liner 150. The expander tool 115 has a body 102 that is hollow and generally tubular with connectors 104 and 106 for connection to other components (not shown) of a downhole assembly. The connectors 104 and 106 are of a reduced diameter compared to the outside diameter of the longitudinally central body part of the tool 115.

The central body part 102 of the expander tool 115 shown in FIG. 2 has three recesses 114, each holding a respective roller 116. Each of the recesses 114 has parallel sides and extends radially from a radially perforated tubular core (not shown) of the tool 115. Each of the mutually identical rollers 116 is somewhat cylindrical and barreled. Each of the rollers 116 is mounted by means of an axle 118 at each end of the respective roller 116 and the axles are mounted in slidable pistons 120. The rollers 116 are arranged for rotation about a respective rotational axis that is parallel to the longitudinal axis of the tool 115 and radially offset therefrom at 120-degree mutual circumferential separations around the central body 102. The axles 118 are formed as integral end members of the rollers 116, with the pistons 120 being radially slidable, one piston 120 being slidably sealed within each radially extended recess 114. The inner end of each piston 120 is exposed to the pressure of fluid within the hollow core of the tool 115 by way of the radial perforations in the tubular core. In this manner, pressurized fluid provided from the surface of the well, via the work string (not shown), can actuate the pistons 120 and cause them to extend outward allowing the rollers 116 contact the inner surfaces 183, 188 of the tubulars 180, 185.

Figure 3:
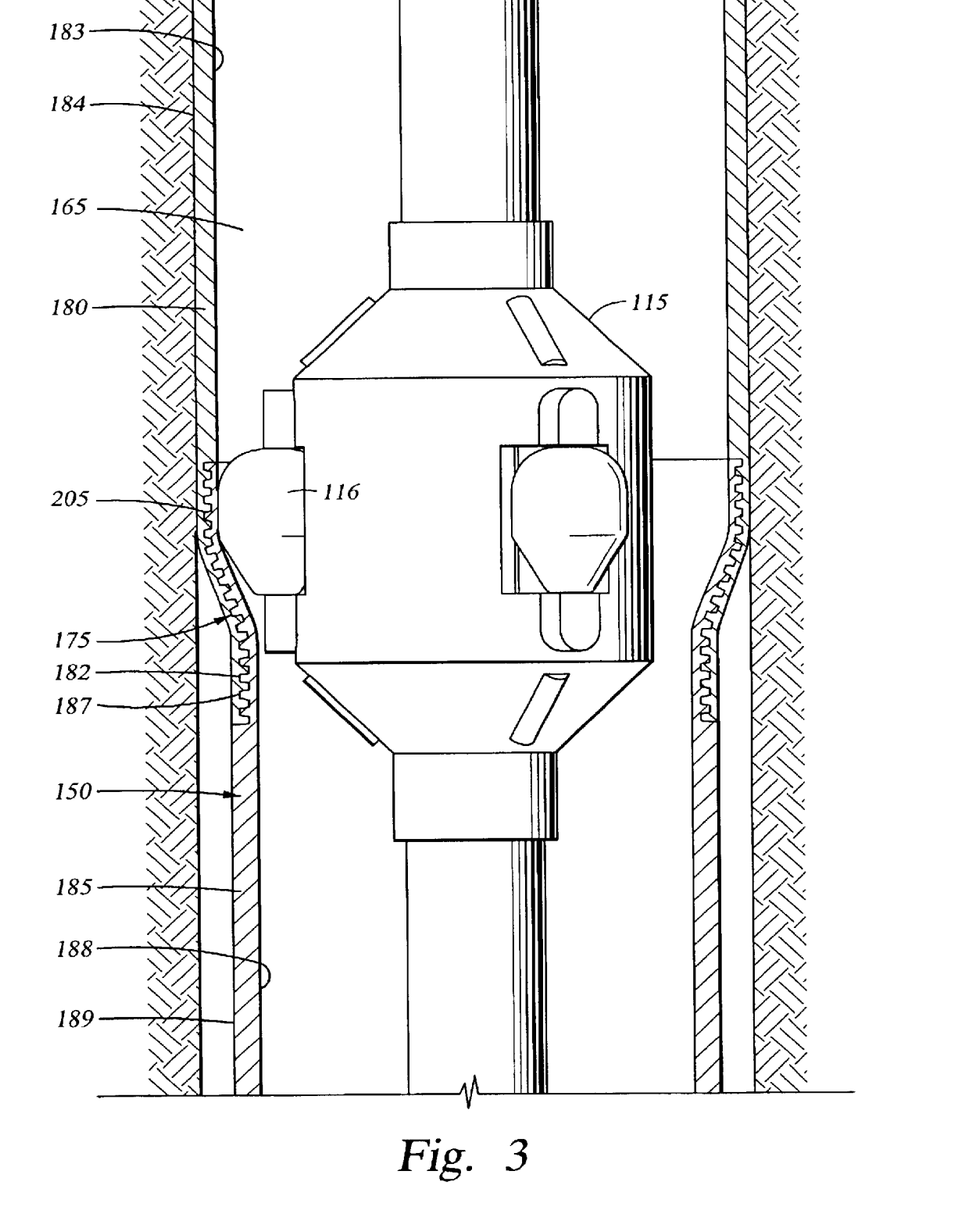
FIG. 3 is a cross-sectional view illustrating the expandable liner partially expanded into contact with the wellbore by the expander tool.

FIG. 3 is a cross-sectional view illustrating the expandable liner 150 partially expanded into contact with the wellbore 100 by the expander tool 115. The upper torque anchor (not shown) is energized to ensure the running assembly and the expandable liner 150 will not rotate during the expansion operation. Hydraulic pressure is increased to a predetermined pressure to actuate the pistons in the expander tool 115. Upon actuation of the pistons, the rollers 116 are extended until they contact the inner surface 183 of the expandable tubular 180. The rollers 116 of the expander tool 115 are further extended until the rollers 116 plastically deform the tubular 180 into a state of permanent expansion. The motor (not shown) rotates the expander tool 115 during the expansion process, and the tubular 180 is expanded until the outer surface 184 contacts the inner surface of the wellbore 100. As the expander tool 115 expands the expandable liner 150, the cross-sectional thickness of the expandable liner 150 is necessarily reduced. Therefore, as the rollers 116 expand the threaded connection 175, the initially tight fit between the threaded portions 182, 187 become slackened, thereby affecting the seal at the threaded connection 175. The slacked threaded connection 175 allows wellbore fluid in an annulus 165 to contact the swelling elastomer 205, thereby causing the polymer chains of the elastomer 205 to shift positions, and expand the swelling elastomer 205 both laterally and radially as shown in FIGS. 4A and 4B.

Figure 4A:
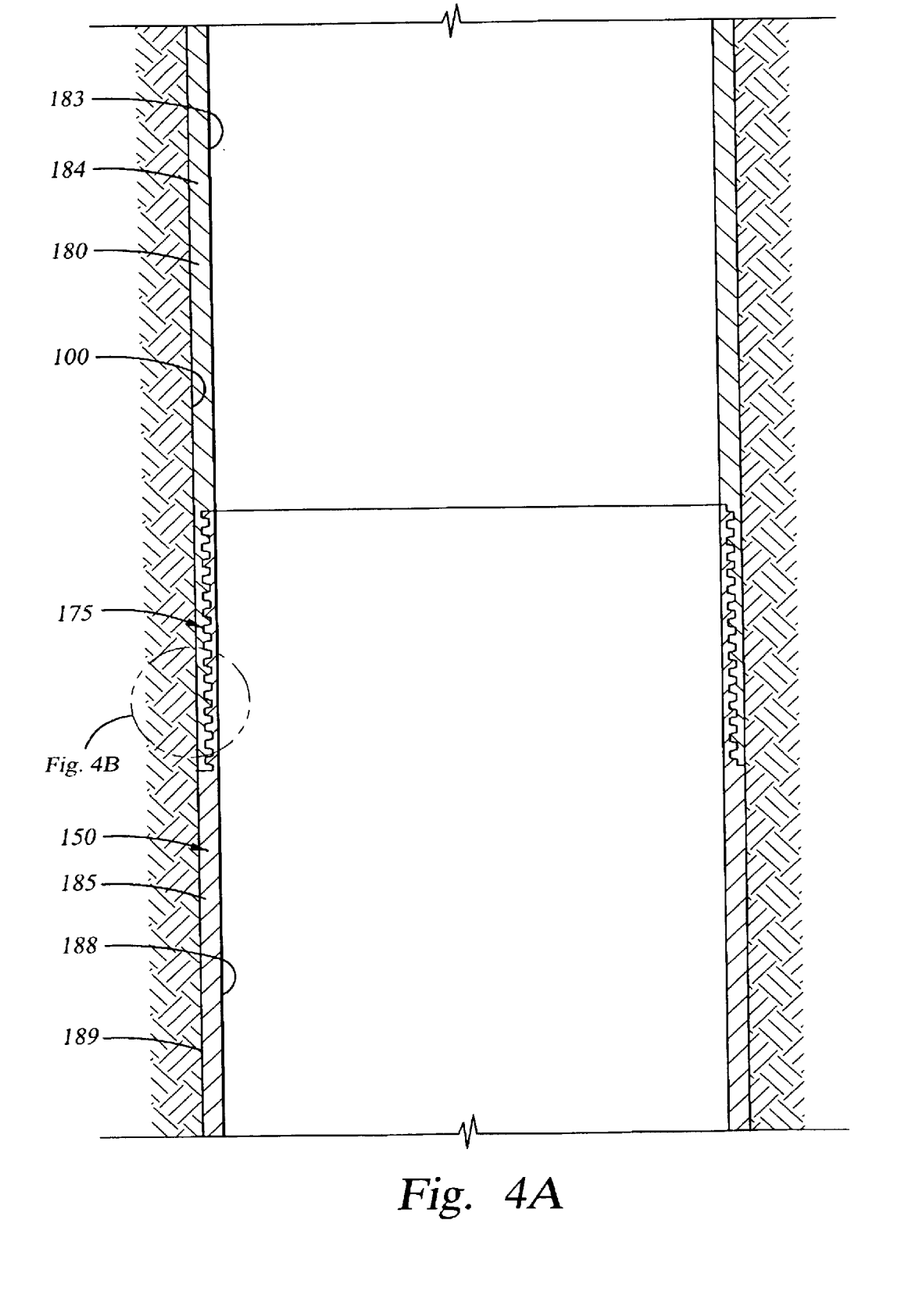
FIG. 4A is a cross-sectional view of the expandable liner fully expanded into contact with the surrounding wellbore.

FIG. 4A is a cross-sectional view of the expandable liner 150 fully expanded into contact with the surrounding wellbore 100. As depicted, the upper tubular 180, the threaded connection 175 and the lower tubular 185 are fully expanded into the wellbore 100. As clearly shown on FIG. 4B, the swelling elastomer 205 has sealed off any voids in the threaded connection 175. In this manner, the liner 150 of this present invention may be expanded into the wellbore 100 without any leakage of the wellbore fluid through the threaded connection 175 of the liner 150.

Figure 4B:
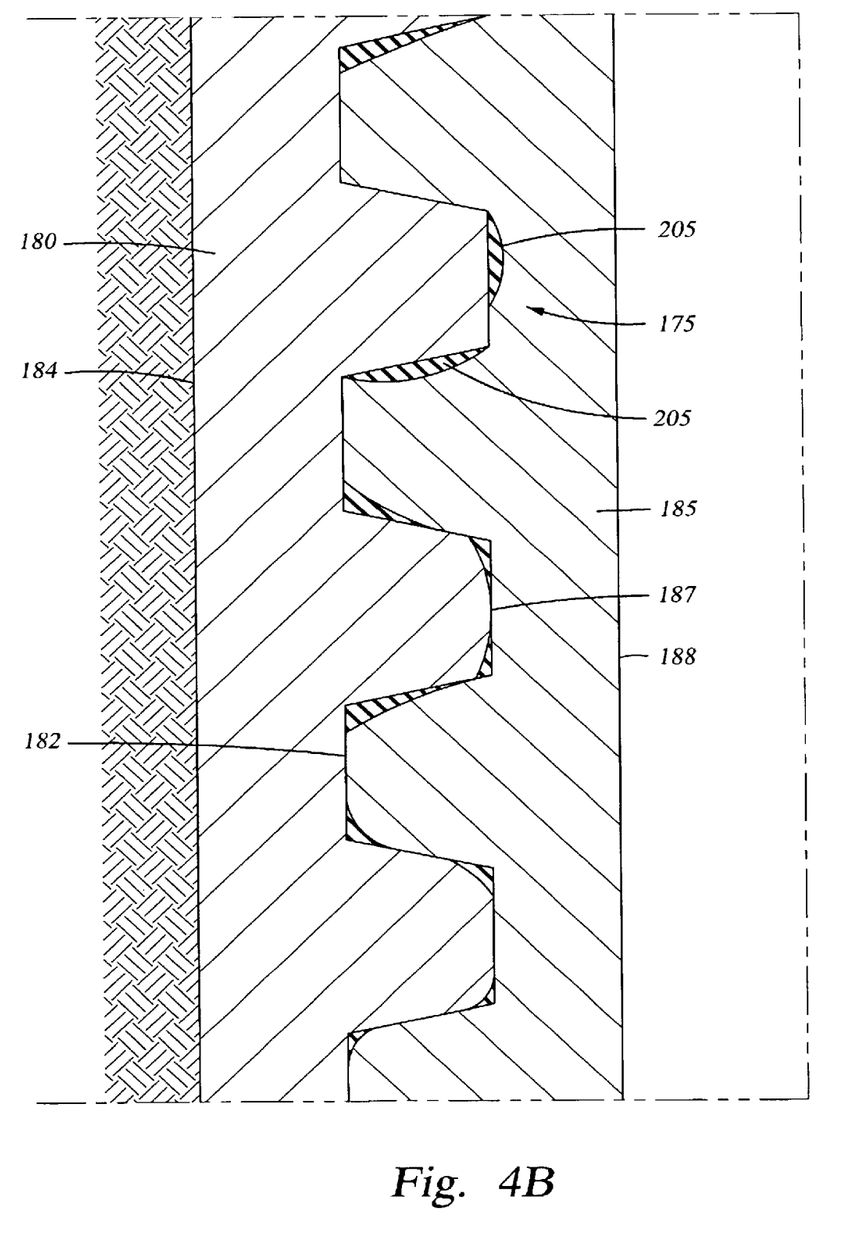
FIG. 4B is an enlarged cross-sectional view illustrating the swelling elastomer providing an effective seal at the threaded connection.

FIG. 4B is an enlarged cross-sectional view illustrating the swelling elastomer 205 providing an effective seal at the threaded connection 175. As shown, the threaded portions 182, 187 have shifted as the wall of the tubulars 180, 185 became thin during the expansion operation. The slack between the threaded portions 182, 187 breaks the fluid tight seal, thereby allowing wellbore fluid in the annulus to leak through the threaded connection 175 to expose the swelling elastomer 205 to the wellbore fluid. Subsequently, the wellbore fluid activates the swelling elastomer 205, thereby causing the polymer chains to expand the swelling elastomer 205 both laterally and radially to fill the voids of the connection. In this manner, the fluid tight seal between the threaded portion 182 of the upper tubular 180 and the threaded portion 187 of the lower tubular 185 is preserved. As a result, wellbore fluid is prevented from leaking through the threaded connection 175.

In operation, the expandable liner assembly and a running assembly are lowered to a desired location in the wellbore on a work string. Thereafter, the upper torque anchor is activated to secure the liner assembly and running assembly in the wellbore. After the expander tool is located at the desired depth, hydraulic pressure is increased to a predetermined pressure to actuate the pistons in the expander tool. Upon actuation of the pistons, the rollers are extended until they contact the inner surface of the expandable liner. The rollers of the expander tool are further extended until the rollers plastically deform the liner into a state of permanent expansion. The motor rotates the expander tool during the expansion process, and the liner is expanded until the outer surface contacts the inner surface of the wellbore. As the expander tool expands the liner, the cross-sectional thickness of the expandable liner is necessarily reduced. Therefore, as the rollers expand the threaded connection, the initially tight fit between the threaded portions become slack, thereby affecting the seal at the threaded connection. The slackness at the threaded connection allows wellbore fluid in the annulus to contact the swelling elastomer, thereby causing the polymer chains of the elastomer to shift positions, and expand the swelling elastomer both laterally and radially to fill the voids in the threaded connection.

While the foregoing is directed to embodiments of the present invention, other and further embodiments of the invention may be devised without departing from the basic scope thereof, and the scope thereof is determined by the claims that follow.

What is claimed is:

1. An apparatus for use in a wellbore, the apparatus comprising:
   a first expandable tubular having a connection means at an end thereof;
   a second expandable tubular having a mating connection means at an end thereof, the connection means and mating connection means constructed and arranged to form a connection between the tubulars; and a swelling elastomer disposable between the connection means and the mating connection means, the swelling elastomer expandable upon contact with an activating agent.

2. The apparatus of claim 1, wherein the swelling elastomer fills a space within the connection.

3. The apparatus of claim 2, wherein upon an application of a radially outward force supplied to an inner surface of the connection, the first and second expandable tubulars expand radially outward.

4. The apparatus of claim 3, wherein the application of the radially outward force supplied to the inner surface causes the activating agent to contact the swelling elastomer, thereby causing the swelling elastomer to expand to fill the space.

5. The apparatus of claim 3, wherein the radially outward force is applied by an expander tool having at least one fluid actuated expander member extendable radially outwards.

6. The apparatus of claim 3, wherein the radially outward force is applied by a cone shaped member.

7. A method for utilizing an expandable connection in a wellbore, comprising:

running an assembly on a tubular string into the wellbore, the assembly including:
  a first tubular having a connection means;
  a second tubular having a mating connection means, the connection means and mating connection means constructed and arranged to form a connection between the tubulars; and
  a swelling elastomer disposable between the connection means and the mating connection means;

applying a force to an inner surface of the connection;

expanding the assembly radially outward; and exposing the swelling elastomer to an activating agent, thereby ensuring that a space within the connection is substantially filled with the swelling elastomer.

8. The method of claim 7, wherein the swelling elastomer is exposed to the activating agent as the assembly is expanded.

9. The method of claim 7, wherein the connection means consists of threads disposed on an outer surface of the first tubular and the mating connection means consists of threads disposed on an inner surface of the second tubular.

10. The method of claim 9, wherein the swelling elastomer is disposed on the threads of the first tubular.

11. The method of claim 9, wherein the swelling elastomer is disposed on the threads of the second tubular.

12. The method of claim 9, wherein the swelling elastomer is disposed on the threads of both the first and second tubular.

13. The method of claim 9, wherein the application of the force to the inner surface of the assembly causes the activating agent to react with the swelling elastomer.

14. The method of claim 13, further including the step of allowing the activated swelling elastomer to fill in a gap between the threads on the first tubular and the threads on the second tubular.

15. The method of claim 7, wherein the activating agent is wellbore fluid.

16. The method of claim 7, wherein the force is applied by an expander tool having at least one fluid actuated expander member extendable radially outwards.

17. The method of claim 7, wherein the force is applied by a cone shaped member.

18. An expandable connection comprising:

a first member having a connection means at the end thereof;

a second member having a mating connection means at an end thereof, the connection means and mating connection means formable into a connection; and a swelling elastomer disposable between the connection means and the mating connection means, whereby a force supplied to an inner surface causes the first and second members to expand radially outward and to permit an activating agent to activate the swelling elastomer to fill an annular area between the connection means and the mating connection means.

19. An apparatus for use in a wellbore, the apparatus comprising:

a first tubular having a connection means at an end thereof;

a second tubular having a mating connection means at an end thereof, the connection means and mating connection means constructed and arranged to form a connection between the tubulars; and a swelling elastomer disposable between the connection means and the mating connection means, the swelling elastomer expandable upon contact with wellbore fluid.

20. An apparatus for use in a wellbore, the apparatus comprising:

a first tubular having a threaded portion on an outer surface at an end thereof;

a second tubular having a mating threaded portion on an inner surface at an end thereof, the threaded portion and the mating threaded portion constructed and arranged to form a connection between the tubulars; and a swelling elastomer disposable between the threaded portion and the mating threaded portion, the swelling elastomer expandable upon contact with an activating agent.

21. The apparatus of claim 20, wherein the swelling elastomer is disposed on the threaded portion of the first tubular.

22. The apparatus of claim 20, wherein the swelling elastomer is disposed on the threaded portion of the second tubular.

23. The apparatus of claim 20, wherein the swelling elastomer is disposed on the threaded portion of both the first and second tubular.

* * * * *